United States Patent [19]

Levendusky et al.

[11] 4,390,653

[45] Jun. 28, 1983

[54] FLAME-RETARDANT FILLED POLYPROPYLENE COMPOUND WITH IMPROVED FLOW PROPERTIES

[75] Inventors: Thomas L. Levendusky, Greensburg; William L. Burton, Natrona Heights, both of Pa.

[73] Assignee: Aluminum Company of America, Pittsburgh, Pa.

[21] Appl. No.: 341,904

[22] Filed: Jan. 22, 1982

[51] Int. Cl.$^3$ .................... C08K 3/22; C08K 9/04
[52] U.S. Cl. .................. 524/322; 106/287.17; 106/286.5; 106/286.6; 260/DIG. 24; 524/430; 524/433; 524/437; 524/528; 524/567; 524/583; 524/584; 524/585; 524/586
[58] Field of Search ........... 106/308 F, 287.17, 286.5, 106/286.6; 524/430, 437, 322, 583, 584, 433, 528; 260/DIG. 24

[56] References Cited

U.S. PATENT DOCUMENTS

| | | | |
|---|---|---|---|
| 3,826,775 | 7/1974 | Sobolev et al. | 524/107 |
| 4,126,593 | 11/1978 | Takashashi | 106/308 F |
| 4,132,700 | 1/1979 | Stephens et al. | 523/216 |
| 4,191,670 | 3/1980 | Strauch et al. | 106/308 F |
| 4,216,130 | 8/1980 | Rigge et al. | 523/200 |
| 4,234,469 | 11/1980 | Ohta et al. | 524/411 |
| 4,236,934 | 12/1980 | Bell | 106/308 F |
| 4,246,040 | 1/1981 | Okumura et al. | 106/308 F |
| 4,263,186 | 4/1981 | Blüemel | 524/322 |
| 4,283,316 | 8/1981 | Bonsignore | 524/322 |

OTHER PUBLICATIONS

"Emery Stearic and Palmitic Acids" Product Bulletin, Emery Industries, Inc. pp. 1 to 27.

*Primary Examiner*—Ronald W. Griffin
*Attorney, Agent, or Firm*—Glenn E. Klepac

[57] ABSTRACT

An improved flame-retardant thermoplastic compound based upon a surface modified alumina hydrate composition containing powdered alumina hydrate, a liquid mixture of $C_{10}$–$C_{20}$ carboxylic acids and a solid mixture of $C_{14}$–$C_{20}$ carboxylic acids. A preferred solid mixture comprises stearic acid and palmitic acid. Thermoplastic compounds made with polypropylene and an alumina hydrate composition containing isostearic acid together with the solid fatty acid mixture of the invention exhibit an increased melt index and reduced molding pressure compared with polypropylene compounds made with isostearic acid coated alumina hydrate and no solid fatty acid mixture.

16 Claims, No Drawings

FLAME-RETARDANT FILLED POLYPROPYLENE COMPOUND WITH IMPROVED FLOW PROPERTIES

BACKGROUND OF THE INVENTION

Flame-retardant compounds combining polypropylene and various inorganic fillers are known in the prior art. However, these prior art filled polypropylene compounds generally suffer from one or more serious disadvantages making them less than entirely suitable for their intended purpose.

One commercially available polypropylene compound has a formula that includes 27 wt% chlorinated paraffin and 10 wt% antimony oxide. Another polypropylene compound, disclosed in U.S. Pat. No. 4,234,469, comprises an inorganic filler (either talc, kaolinite, sericite, silica or diatomaceous earth), antimony oxide and an organic halide flame-retarder (decabromodiphenyl ether, dodecachlorododecahydrodimethanobenzocyclooctene, or mixtures thereof). Polypropylene compounds containing chlorinated paraffin or other organic halides generally possess satisfactory resistance to high temperature conditions. However, these compounds are difficult and expensive to mold because it is not practical to avoid the formation of HCl or HBr under commercial operating conditions. Consequently, the molds must be coated with gold or other expensive acid-resistant metal.

It is a principal object of the present invention to provide a flame-retardant polypropylene compound containing an inorganic filler and no organic halide compounds.

It is a related object of the invention to provide a flame-retardant polypropylene compound that is filled with alumina hydrate and possesses better physical properties and improved processing characteristics compared with prior art alumina hydrate filled polypropylene compounds.

Additional objects and advantages of the present invention will become apparent to persons skilled in the art from the following specification and claims.

SUMMARY OF THE INVENTION

The present invention can be summarized as a surface modified inorganic filler composition compatible with thermoplastic resins, said filler composition comprising a powdered inorganic filler, a surface modifier for the filler, and a solid mixture of $C_{14}$–$C_{20}$ carboxylic acids having a titer of about 30° to 70° C. A thermoplastic resin compound is made by blending about 100 parts by weight of a thermoplastic resin with up to about 190 parts by weight of the filler composition of the invention.

The powdered inorganic filler of the invention is preferably alumina hydrate having a median particle size of less than about 2 microns. In a particularly preferred form of alumina hydrate, essentially all (i.e. at least 99%) of the hydrate has a particle size of about 2 microns or less.

The surface modifier for the filler preferably comprises a liquid mixture of fatty acids having a titer below about 20° C. and an iodine value of about 15 or less. A preferred liquid fatty acid mixture is isostearic acid, which has a maximum titer of about 10.0° C. and a maximum iodine value of about 3.0.

The solid fatty acid mixture of the invention has an iodine value of about 15 or less. A preferred solid mixture comprises about 40 to 50% by weight stearic acid and about 45 to 55% by weight palmitic acid. A particularly preferred solid mixture comprising 50 wt% palmitic acid, 45.5 wt% stearic acid and remainder other $C_{14}$ to $C_{20}$ saturated fatty acids, has a titer of about 55° to 55.5° C.

The liquid fatty acid surface modifier comprises about 0.5 to 1.5% and preferably about 1.0% of the weight of the filler. The solid fatty acid mixture comprises about 0.8 to 2.4%, preferably about 1.0 to 2.0% of the weight of the filler. The proportion of solid fatty acid mixture in the composition should be at least equal to the proportion of liquid fatty acid mixture.

Up to about 190 parts by weight of the filler composition are blended with about 100 parts by weight of a thermoplastic resin. Some preferred resins are polypropylene homopolymers, polypropylene copolymers and mixtures thereof.

DETAILED DESCRIPTION OF A PREFERRED EMBODIMENT

In accordance with the present invention, a powdered inorganic filler is provided with a surface coating of a liquid mixture of saturated $C_{10}$–$C_{20}$ carboxylic acids. The filler is preferably alumina hydrate but may also be another flame-retardant filler available in particulate form such as bauxite or magnesium hydroxide. Median particle size of the filler is less than 15 microns and preferably less than about 2 microns. In a particularly preferred embodiment, the inorganic filler is alumina hydrate in which essentially all (i.e. at least 99%) of the filler has a particle size of less than 2 microns.

The filler is treated with a surface modifier. A preferred surface modifier comprises about 0.5 to 1.5 wt% of a liquid mixture of saturated $C_{10}$–$C_{20}$ carboxylic acids. The liquid mixture has a titer below about 20° C. and an iodine value of about 15 or less. In a preferred embodiment, the filler comprises alumina hydrate surface coated with about 1.0 wt% of isostearic acid. A preferred surface modified alumina hydrate composition is sold under the trade name "Lubral 710" by Aluminum Company of America of Pittsburgh, Pa. Some additional properties of the preferred surface modified alumina hydrate composition are set forth in Bonsignore U.S. Pat. No. 4,283,316, the disclosure of which is incorporated herein by reference to the extent not inconsistent with the present invention.

A filled thermoplastic compound is formed by dry-blending the isostearic acid coated alumina hydrate with a blend of propylene resins by tumble drying, then adding this mixture to an intensive mixer. The mixture is blended in the intensive mixer for about four to five minutes and then a solid mixture of $C_{14}$–$C_{20}$ carboxylic acids is added to improve the processing characteristics of the mixture.

In a particularly preferred embodiment, the thermoplastic resin is a blend of Hercules 7823 copolymer polypropylene and Hercules 6523 homopolymer polypropylene in a 1:1 ratio. Other preferred polypropylene homopolymers, polypropylene copolymers or mixtures of such homopolymers and copolymers may be used if desired. In its broader aspects, the present invention may be applicable to the blending of inorganic fillers such as alumina hydrate with thermoplastic resins in general, including polyethylene, polypropylene, polyvinyl chloride and mixtures and copolymers thereof.

The solid mixture of $C_{14}$-$C_{20}$ carboxylic acids has a titer of about 30° to 70° C. and an iodine value of about 15 or less. The mixture preferably comprises predominately saturated carboxylic acids in order to minimize the iodine value. Solid mixtures comprising about 40 to 50 wt% stearic acid, about 45 to 55 wt% palmitic acid, remainder other saturated $C_{14}$ to $C_{20}$ fatty acids have been found quite suitable. A particularly preferred solid fatty acid mixture is sold under the trade name "Emersol 132" by Emery Industries, Inc. of Cincinnati, Ohio. This mixture has a nominal composition of 50 wt% palmitic acid, 45.5 wt% stearic acid, 2.5 wt% myristic acid, 1.5 wt% margaric acid and 0.5 wt% pentadecanoic acid. The mixture has a titer of 55°–55.5° C., a maximum iodine value of 0.5 (Wijs) and a density of 0.849 g/cm³ at 75° C.

The solid fatty acid mixture is added to the compound in an amount equivalent to about 0.8 to 2.4% of the weight of the alumina hydrate filler. The proportion of solid mixture added is at least equal to the proportion of liquid fatty acid mixture coating the filler. When the alumina hydrate filler has a 1.0 wt% coating of isostearic acid, the thermoplastic compound comprises about 1.0 to 2.0 wt% of the solid fatty acid mixture based on the weight of the alumina hydrate filler.

After the filled resin compound is blended in the intensive mixer, the compound is transferred either to a melt pump for stranding and subsequent pelletizing or to a roll mill for sheeting and subsequent dicing. In the examples that follow the pellets were dried and then injection molded to prepare test samples.

EXAMPLES

The following examples, summarized in Table 1, illustrate the value of providing filled polypropylene compounds with isostearic acid coated alumina hydrate together with the solid fatty acid mixture of the present invention. In each of these examples, 62 parts by weight coated or uncoated alumina hydrate were combined with 37 parts by weight resin. The alumina hydrate was coated with 1.0 wt% isostearic acid (based on the weight of the alumina hydrate) in Examples 2, 4–6, and 8–10, but no isostearic acid coating was provided in Examples 1, 3 and 7. The solid fatty acid mixture of the invention was added in an amount equivalent to 1.6 wt% (based on the weight of the alumina hydrate) in Examples 1–4, 6, 7, 9 and 10 but not in Examples 5 and 8. Addition of the solid fatty acid mixture in Examples 1–4, 6, 7, 9 and 10 yielded a filled compound containing 62 parts by weight alumina hydrate, 37 parts by weight resin and about 1 part by weight solid fatty acids.

The resin used in Examples 1 and 2 is a polypropylene homopolymer sold under the trade designation Shell 7328 by Shell Chemical Company. The resins used in Examples 3–10 are each a blend of a Hercules polypropylene copolymer and a Hercules polypropylene homopolymer in a 1:1 ratio.

TABLE 1

Physical Properties of Filled Polypropylene Compounds With and Without Solid Fatty Acid Mixture

| Example No. | Resin Type | Isostearic Acid Coating on Alumina Trihydrate | Added Solid Fatty Acid Mixture | Notched Impact Strength (ft-lb/in) | Melt Index (g/10 min) | Tensile Strength at Yield (psi) | Molding Pressure (psi) |
|---|---|---|---|---|---|---|---|
| 1 | Shell 7328PP | No | Yes | 0.06 | 13.9 | 2135 | 1400 |
| 2 | Shell 7328PP | Yes | Yes | 0.16 | 56.4 | 1879 | 1300 |
| 3 | Hercules 7623PM/6523 | No | Yes | 0.19 | 7.1 | — | 1500 |
| 4 | Hercules 7623PM/6523 | Yes | Yes | 0.32 | 19.6 | 2447 | 1400 |
| 5 | Hercules PD195/7623 | Yes | No | 0.70 | 8.3 | 2579 | 1500 |
| 6 | Hercules PD195/7623 | Yes | Yes | 0.46 | 10.6 | 2550 | 1500 |
| 7 | Hercules PD195/7623 | No | Yes | 0.30 | 2.4 | — | 1500 |
| 8 | Hercules PD195/6523 | Yes | No | 0.68 | 10.7 | 2685 | 1600 |
| 9 | Hercules 7523/6523 | Yes | Yes | 0.64 | 57.5 | 2568 | 1200 |
| 10 | Hercules 7823/6523 | Yes | Yes | 0.72 | 25.3 | 2800 | 1400 |

The filled compound of Example 10 which included a Hercules 7823/6523 resin blend was judged to exhibit the best balance of flow properties and physical properties of all filled compounds tested.

The absence of tensile strength measurements for the samples of Examples 3 and 7 resulted from incomplete mold fill which could not be overcome by increasing injection pressure. Accordingly, it was not possible to obtain samples for tensile strength testing. The generally inferior results obtained for Examples 1, 3 and 7, wherein solid fatty acids were added but the alumina hydrate had no isostearic acid coating, indicate that a combination of isostearic acid coated hydrate and the solid fatty acid mixture of the invention is necessary to produce optimum properties in filled resin compounds.

Samples of filled resin compounds prepared in accordance with the present invention are flame retardant (UL 94 V-0) and generate low levels of smoke during burning. In addition, the samples have a good surface appearance. It is significant that these properties and the flow characteristics and physical test results summarized in Table 1 are obtainable in a filled resin compound without addition of any halogenated hydrocarbons to the system.

The present invention has been described by referring to some preferred composition ranges together with several specific examples. Persons skilled in the art will understand that numerous changes and modifications can be made without departing from the spirit and scope of the following claims.

What is claimed is:

1. A surface modified inorganic filler composition compatible with thermoplastic resins, said composition comprising
   (a) a powdered inorganic filler having a median particle size of less than about 15 microns, said filler being selected from the group consisting of alumina hydrate, bauxite and magnesium hydroxide;
   (b) about 0.5 to 1.5%, based on the weight of the filler, of a liquid surface modifier for the filler, said liquid surface modifier having a titer below about 20° C. and an iodine value of about 15 or less; and
   (c) about 0.8 to 2.4%, based on the weight of the filler, of a solid mixture of $C_{14}$–$C_{20}$ carboxylic acids, said solid mixture having a titer of about 30° to 70° C. and an iodine value of about 15 or less.

2. The composition of claim 1 wherein said surface modifier comprises a liquid mixture of $C_{10}$–$C_{20}$ carboxylic acids.

3. A thermoplastic resin compound comprising about 100 parts by weight of a thermoplastic resin selected from the group consisting of polyethylene, polypropylene, polyvinyl chloride and mixtures and copolymers thereof, and the composition of claim 2 in an amount up to about 190 parts by weight.

4. The compound of claim 3 wherein said thermoplastic resin is selected from the group consisting of polypropylene homopolymers, polypropylene copolymers, and mixtures thereof.

5. The compound of claim 4 wherein said solid mixture comprises about 40 to 50% by weight stearic acid and about 45 to 55% by weight palmitic acid.

6. The compound of claim 4 wherein the proportion of said solid mixture is at least equal to the proportion of said liquid mixture.

7. The compound of claim 4 wherein said inorganic filler comprises alumina hydrate having a median particle size of less than about two microns.

8. The compound of claim 7 wherein essentially all of said alumina hydrate has a particle size of less than two microns.

9. The compound of claim 4 or claim 7 wherein said liquid mixture comprises isostearic acid.

10. The compound of claim 7 comprising about 1.0% isostearic acid and about 1.0 to 2.0% of said solid mixture, based on the weight of the alumina hydrate.

11. The compound of claim 4 wherein said thermoplastic resin comprises a mixture of a polypropylene copolymer and a polypropylene homopolymer.

12. A method for forming a filled flame-retardant polypropylene compound having improved processing characteristics, comprising the steps of
   (a) blending alumina hydrate having a median particle size of less than about 15 microns with about 0.5 to 1.5%, based on the weight of the alumina hydrate, of a liquid mixture of $C_{10}$–$C_{20}$ carboxylic acids, said liquid mixture having a titer below about 20° C. and an iodine value of about 15 or less, thereby to form a surface modified alumina hydrate composition;
   (b) blending about 10 to 190 parts by weight of said composition with 100 parts by weight of a thermoplastic resin selected from the group consisting of polypropylene homopolymers, polypropylene copolymers and mixtures thereof, thereby to form a polypropylene compound; and
   (c) blending said polypropylene compound with about 0.8 to 2.4%, based upon the weight of the alumina hydrate, of a solid mixture of $C_{14}$–$C_{20}$ carboxylic acids, said solid mixture having a titer of about 30° to 70° C. and an iodine value of about 15 or less.

13. The method of claim 12 wherein said liquid mixture comprises isostearic acid.

14. The method of claim 13 wherein said solid mixture comprises about 40 to 50% by weight stearic acid and about 45 to 55% by weight palmitic acid.

15. The method of claim 13 wherein said alumina hydrate has a median particle size of less than about two microns.

16. The method of claim 15 wherein essentially all of said alumina hydrate has a particle size of less than two microns.

* * * * *